US009178227B2

(12) United States Patent
Iwanschitz et al.

(10) Patent No.: US 9,178,227 B2
(45) Date of Patent: Nov. 3, 2015

(54) METHOD FOR THE MANUFACTURE OF CONTACTS BETWEEN ELECTROCHEMICALLY ACTIVE DISCS AND INTERCONNECTORS IN HIGH TEMPERATURE FUEL CELLS

(75) Inventors: Boris Iwanschitz, Winterthur (CH); Josef Sfeir, Buelach (CH); Ueli Weissen, Winterthur (CH); Andreas Kaiser, Roskilde (DK)

(73) Assignee: Hexis AG, Winterthur (CH)

( * ) Notice: Subject to any disclaimer, the term of this patent is extended or adjusted under 35 U.S.C. 154(b) by 786 days.

(21) Appl. No.: 12/151,439

(22) Filed: May 6, 2008

(65) Prior Publication Data

US 2008/0280186 A1 Nov. 13, 2008

(30) Foreign Application Priority Data

May 9, 2007 (EP) .................................... 07107780

(51) Int. Cl.

*H01M 2/24* (2006.01)
*H01M 8/02* (2006.01)
*H01M 8/24* (2006.01)
*H01M 4/86* (2006.01)
*H01M 8/12* (2006.01)

(52) U.S. Cl.

CPC ............ *H01M 8/0297* (2013.01); *H01M 8/025* (2013.01); *H01M 8/0234* (2013.01); *H01M 8/0239* (2013.01); *H01M 8/0243* (2013.01); *H01M 8/0245* (2013.01); *H01M 8/2425* (2013.01); *H01M 4/8657* (2013.01); *H01M 2008/1293* (2013.01); *Y02E 60/50* (2013.01); *Y02E 60/525* (2013.01)

(58) Field of Classification Search

USPC .......................................... 427/115; 429/32
IPC ............................................... H01M 8/12,8/24
See application file for complete search history.

(56) References Cited

U.S. PATENT DOCUMENTS

| | | | | |
|---|---|---|---|---|
| 5,116,696 | A * | 5/1992 | Barp | 429/26 |
| 5,264,300 | A * | 11/1993 | Barp et al. | 429/30 |
| 2004/0046151 | A1 * | 3/2004 | Saija et al. | 252/500 |
| 2004/0081893 | A1 * | 4/2004 | Hansen et al. | 429/321 |
| 2007/0003819 | A1 | 1/2007 | Zhang | |

FOREIGN PATENT DOCUMENTS

| | | | | |
|---|---|---|---|---|
| DE | 42 37 602 | A1 | 5/1994 | |
| DE | 4436456 | A1 * | 4/1996 | B05D 5/12 |

(Continued)

*Primary Examiner* — Kaj K Olsen
(74) *Attorney, Agent, or Firm* — Kilpatrick Townsend & Stockton LLP

(57) ABSTRACT

The method serves for the manufacture of contacts between electrochemically active discs (2) and interconnectors (1) in planar high temperature fuel cells. The interconnectors have air-side and gas-side surface profiles (11, 11') with contact surfaces (100) located on raised portions (10). A layer consisting of a contacting mixture (22, 22') is respectively applied onto the electrodes (21, 21') of the electrochemically active discs or onto the contact surfaces. The surface profiles for the electrodes are brought into contact with the applied layer so that, at a working temperature, the raised portions penetrate into this layer. Connections are formed between the contact surfaces and electrically conductive particles in this way and thus form discrete, homogeneously structured connections between the contact surfaces and the electrodes. Finally the medium embedding the particles is removed under thermal part treatments and the discrete connections are solidified.

38 Claims, 1 Drawing Sheet

(56) References Cited

FOREIGN PATENT DOCUMENTS

| | | | | |
|---|---|---|---|---|
| DE | 10342160 A1 * | 4/2005 | .............. | H01M 8/12 |
| EP | 0 714 147 A1 | 5/1996 | | |
| EP | 0714147 A1 * | 5/1996 | .............. | H01M 8/24 |
| WO | WO 98/40921 A1 | 9/1998 | | |

* cited by examiner

METHOD FOR THE MANUFACTURE OF CONTACTS BETWEEN ELECTROCHEMICALLY ACTIVE DISCS AND INTERCONNECTORS IN HIGH TEMPERATURE FUEL CELLS

CROSS-REFERENCES TO RELATED APPLICATIONS

This application claims the priority of European Application No. 07107780.4, filed on May 9, 2007, the disclosure of which is incorporated herein by reference.

BACKGROUND OF THE INVENTION

The invention relates to a method for the manufacture of contacts between electrochemically active discs and interconnectors in planar high temperature fuel cells. It also relates to a fuel cell battery having such contacts. The fuel cells are solid oxide fuel cells (SOFC, Solid Oxide Fuel Cells) which operate at temperatures between 700° C. and 950° C. The interconnector separates an air side from a gas side and establishes an electrical connection between adjacent fuel cells.

A battery of planar fuel cells includes a stack of cells, in which alternating plate-like interconnectors and electrochemically active discs, so-called PEN elements (discs with three layers: positive electrode-electrolyte-negative electrode), are arranged. The interconnectors are also termed a bipolar plate. They provide discrete contacts in the form of pimples or webs between the electrodes of adjacent PEN elements. The pimples for example form a special pattern in which the pimples all have the same form and a grid-like arrangement having a density of at least 10 pimples per $cm^2$. For a good degree of efficiency of the fuel cell battery with minimal ohmic losses a contacting of the PEN elements with the interconnectors is required which has a uniformly low electrical resistance. In accordance with a known method the contact layer is manufactured from a paste which is a mixture of a powder-like electrically conductive material and a liquid (see for example US 2007/003819 with the title "Electrically Conductive Fuel Cell Contact Material). A contact mixture of this kind can be applied by means of screen printing, slip spraying or slip rolling onto the electrodes or onto contact surfaces formed by the pimples or webs. After an assembly of the cells to form a stack, solid connections between the contact surfaces and the electrodes arise out of the contact mixture by drying and firing. During this assembly the paste that is applied is kept moist in order to be able to compensate for differences in height of the pimples and webs. It has, however, now been shown that the assembly of the cell stack leads to partly insufficiently formed inhomogeneous connections. As a result of this deficiency, cell voltages are measured at the cells of the assembled stack which are of different sizes and which signify ohmic losses which are not ideal. A reduction of the tolerances during the manufacture of the interconnectors cannot be considered for cost reasons.

SUMMARY OF THE INVENTION

An object of the present invention is to provide a method for the manufacture of contacts between the electrochemically active discs and interconnectors in which the contacting is improved. This object is satisfied by the embodiments disclosed herein.

The method serves for the manufacture of contacts between electrochemically active discs and interconnectors in planar high temperature fuel cells. The interconnectors have air-side and gas-side surface profiles with contact surfaces which are located on raised portions. The raised portions of each surface profile having the contact surfaces approximately span a plane. In this arrangement the deviations lie within a predetermined tolerance. In this method a layer consisting of a contacting mixture is respectively applied onto the electrodes of the electrochemically active discs or onto the contact surfaces. The contacting mixture contains electrically conductive particles and a medium embedding the particles. The surface profiles or the electrodes are respectively brought into contact with the applied layer so that, at a working temperature, the raised portions penetrate into this layer. Connections are thus formed between the contact surfaces and the electrically conductive particles and thus discrete homogeneously structured connections are formed between the contact surfaces and the electrodes. Finally the medium embedding the particles is removed under thermal part treatments and the discrete connections are solidified. The medium embedding the particles is a hot melting composition which is solid at room temperature and in particular at a temperature below 40° C. At that working temperature the hot melting composition is in a liquid or plastic state.

The disclosure also includes other advantageous embodiments of the method of the invention. In one embodiment, a fuel cell battery having contacts manufactured in accordance with the invention is disclosed.

BRIEF DESCRIPTION OF THE DRAWINGS

The invention will be explained in the following with reference to the drawings.

DESCRIPTION OF THE PREFERRED EMBODIMENTS

Figure 1:
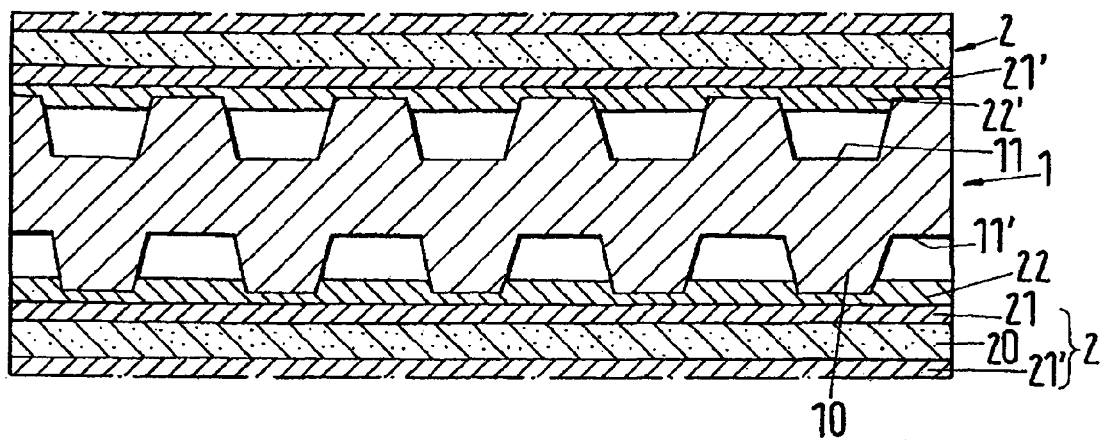
FIG. 1 is a cross-section through an interconnector and two adjoining electrochemically active discs which, in accordance with the invention, are contacted with the interconnector.
Figure 2:
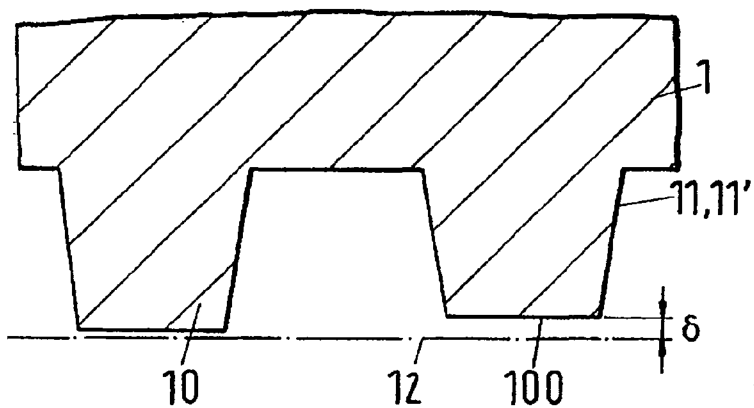
FIG. 2 is an enlargement of the surface profile of the interconnector.

An interconnector 1 for a planar high temperature fuel cell, such as is shown in cut-away manner in FIGS. 1 and 2 as a cross-section, has an air-side surface profile 11 and a gas-side surface profile 11'. These profiles 11, 11' have contact surfaces 100 on raised portions 10. The raised portions with the contact surfaces 100 respectively approximately span a plane 12. Deviations $\delta$ of the contact surfaces 100 from the plane 12 lie within a predetermined tolerance. Contacts between the interconnector 1 and adjacent PEN elements 2 exist at the contact surfaces 100.

In the method of the invention a layer 22 or 22' is respectively applied onto the electrodes 21 and 21' of the PEN elements 2 (i.e. of the electrochemically active discs 2 with a central solid oxide layer 20) and consist of a contacting mixture. This mixture contains electrically conductive particles and a medium embedding the particles. This medium is a hot melting composition which is solid at room temperature and in particular at a temperature below 40° C. At a suitable working temperature the hot melting composition is present in a liquid or plastic state. The contact mixture can be applied to the contact surfaces 100 instead of to the electrodes 21, 21'.

The surface profiles 11, 11' (and/or the electrodes 21, 21') are brought into contact with the applied layer 22 or 22' in such a way that at the named working temperature the raised portions 10 press into this layer 22, 22'. Thus connections are formed between the contact surfaces 100 and the electrically conductive particles, and thus discrete, homogeneous structured connections are found between the contact surfaces 100 and the electrodes 21, 21'. Finally the medium embedding the particles is thermally removed while maintaining the discrete connections, and sinter connections are produced between the particles and also between particles and the contact surfaces 100.

Hot melting compositions are visco-elastic or visco-plastic organic materials, preferably on the basis of resins, natural and synthetic waxes, thermoplastic materials, higher chained alcohols and carboxylic acids (for example stearic acid, palmitic acid). This hot melting composition is transferred, on being heated, into a viscose or thin liquid melt; it thus undergoes a change in the state of aggregation. The melting point of the hot melting composition lies in particular in the range between 40° C. and 80° C. As a rule a homogeneous distribution of the electrically conductive particles can be produced with additional admixed additive substances.

The electrically conductive particles are mixed with the hot melting composition in heated devices to form a homogeneous paste. Conventional mixing devices, such as for example ball mills, stirring mechanisms and/or static mixers, are used for mixing the hot melting composition.

The electrically conductive particles are formed of the same or similar material as an electrode material of the electrode to be contacted, preferably metallic conductors. The electrode material of an anode (gas-side electrode 21) is distinguished from that of a cathode (air-side electrode 21'). For example NiO/YSZ mixtures (YSZ: yttrium stabilized zirconium) are for example used for the anode; LaSrMe-Pervskite (LaSr)(Me)$O_3$, with ME being Co, Mn, Ni, Cr and/or Fe (preferably Mn, Co)), is used for the cathode.

An example for the paste manufacture is: anode powder, 100 g/stearic acid, 16.2 g/additive (Beycostat C213), 2.7 g.

The contacting mixture is for example applied uniformly to the electrodes 21, 21' as a slip, slurry or paste with a temperature at or above the melting point of the hot melting composition by means of a rolling process, a spraying process, a casting process or a printing process, in particular a screen printing process. Directly after it has been applied the contact mixture solidifies to the layer 22, 22'.

The layers formed from the contact mixture can also be separately manufactured foils which are inserted during installation between the interconnectors 1 and the PEN elements 2. The foils can be produced by means of foil casting or calendering.

In the method of the invention the interconnectors 1 and the PEN elements 2 are assembled into a stack in an alternating arrangement and along a stack axis. This stack is uniformly heated in an assembly apparatus to the working temperature of for example 70° C. (in the previously known method with a moist paste the working temperature is the same as room temperature). By means of a readjusting clamping of the assembly apparatus which uniformly exerts a constant or also variable pressing force in the direction of the stack axis, the discrete connections are produced, with the stack height reducing by 3 to 10%. Finally, the hot melting composition is thermally removed—preferably while maintaining the pressing force—and is in particular burned out and the sintered connections are simultaneously formed or formed in a further step.

The layer or foil formed from the contact mixture has a thickness in the range between 30 and 300 μm, preferably between 50 and 200 μm.

The fuel cells are circular in a preferred embodiment of the fuel cell battery. A fuel cell battery of this kind is for example known from EP-A-1 075 033. The cylindrical cell stack includes a central gas distribution passage. At the periphery of the stack axially directed after-burning spaces are provided which are separated at the side by passages provided for the air distribution.

Figure 3:
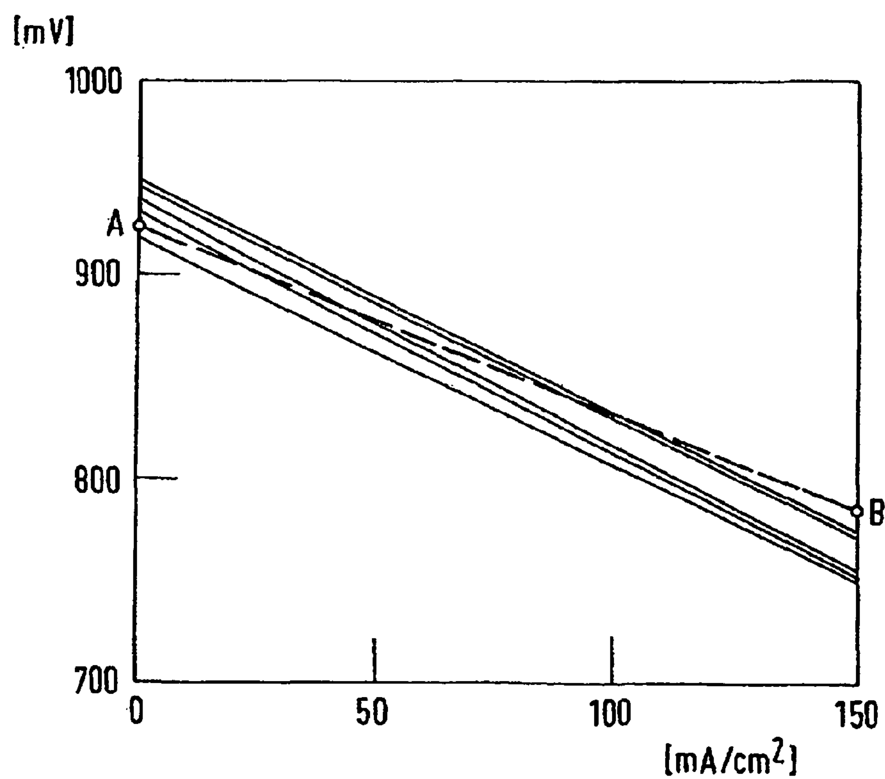
FIG. 3 is a diagram with cell voltages of a stack of cells in which contacting has been carried out in accordance with the prior art.

In FIG. 3 a diagram shows measured cell voltages of a stack of five cells in which contacting has been carried out in accordance with the prior art. The individual cell voltages which are measured with such "stack tests" are illustrated in dependence on the current density with variable load (idling at 0 mA/cm$^2$, average power yield at around 100 mA/cm$^2$). There are no individual measuring points shown but rather only straight lines (five corresponding to the selected number of cells) which reproduce statically evaluated measurement data to a good approximation. An inhomogeneous contacting in this stack test brings about a relatively wide scatter of the individual cell voltages (differing plots of the current-voltage curves) and thus of the area specific cell resistance. The ohmic loss of the stack is consequently higher than with a homogeneous contacting.

The chain-dotted connection line between the points A and B in FIG. 3 shows the cell voltages (only one straight line, practically identical runs of the current-voltage curves) which were measured for one stack. The contacting of the stack was carried out in accordance with the invention and consequently the homogeneity aimed at was achieved. In a fuel cell battery having contacts in accordance with the invention the cell voltages are thus almost constant during its operation. Statistical evaluations of the stack tests show that the area specific cell resistance (ASR: "Area Specific Resistance") is reduced when using the method of the invention by around 15%. The average value of the ASR sinks from around 1.4 Ωcm$^2$ (inhomogeneous contacting) to 1.2 Ωcm$^2$. A significant performance increase results through the improved contacting.

Further advantages of the contacting of the invention:

- The stack assembly is simplified because no moist pastes have to be handled (no danger of short circuits of the electrodes by excessive contact slurry, no premature drying, no danger of contamination, no preparation of coated stack components when using foil-like contacting mixtures).
- For separation of the air and gas flows, seals of glass or glass ceramic solder are used in the planar fuel cell batteries. This sealing material can likewise be applied in paste form. The manufacture of the seals can thus be readily combined with the method of the invention.
- For fuel cells in accordance with the prior art it is necessary to provide a fine nickel wire mesh (Ni-Mesh) at the anode side. This requirement is now avoided.
- Through the contact layers applied to the electrodes the transverse electrical and thermal conductivities are increased.

With the contacts manufactured in accordance with the invention one obtains a fuel cell battery for which all cell voltages are practical of the same size in operation. A fuel cell battery in accordance with the invention of this kind includes a cell stack, in particular a cylindrical stack having circular cells, which includes a central gas distribution passage. Axially aligned after-burner spaces and air distribution passages are arranged at the stack periphery.

The invention claimed is:

1. A method for the manufacture of contacts between electrochemically active discs and interconnectors in planar high temperature fuel cells the interconnectors of which have air-side and gas-side surface profiles with contact surfaces on raised portions, with the raised portions of each surface profile having the contact surfaces approximately spanning a plane and with deviations in this arrangement lying within a predetermined tolerance, in which method a layer is applied onto the electrodes of the electrochemically active discs, with the layer consisting of a contact mixture which contains electrically conductive particles and a medium embedding the particles, the surface profiles or the electrodes are brought into contact with the applied layer at a working temperature so that the raised portions penetrate into this layer and thus connections are formed between the contact surfaces and the electrically conductive particles and thus discrete homogeneously structured connections are formed between the contact surfaces and the electrodes, and finally the medium embedding the particles is removed under thermal part treatments and the discrete connections are solidified, wherein the medium embedding the particles is a hot melting composition which is solid at room temperature and wherein, at the said working temperature, the hot melting composition is in a liquid or plastic state, wherein the medium embedding the particles is applied to the electrode at or above the working temperature and then brought to a solidifying temperature to solidify the hot melting composition, or is applied as a solidified foil between the electrodes and the raised portions, and wherein the applied layer or foil is subsequently heated to said working temperature to form the discrete homogeneously structured connections, wherein the interconnectors and the electrochemically active discs are assembled into a stack in an alternating arrangement and along a stacking axis, with this stack being uniformly heated in an assembly apparatus to the working temperature; wherein from a follow-up clamping of the assembly apparatus, which uniformly exerts a constant or variable pressing force in the direction of a stack axis, the discrete connections are produced with a reduction of the stack height by 3 to 10%, and wherein finally the hot melting composition is thermally removed.

2. A method in accordance with claim 1, wherein visco-elastic or visco-plastic organic materials, which are solid at room temperature and which transfer on heating into a viscous or thin fluid melt, are used as the hot melting composition.

3. A method in accordance with claim 2, wherein the visco-elastic or visco-plastic organic materials are based on resins, natural and synthetic waxes, thermoplastic materials, or higher chain carboxylic acids and alcohols.

4. A method in accordance with claim 2, wherein the melting point of the hot melting composition is in a range between 40 and 80° C.

5. A method in accordance with claim 1, wherein the electrically conductive particles are mixed with the hot melting composition in heated apparatus to form a homogeneous paste, with conventional mixing devices being used.

6. A method in accordance with claim 5, wherein the conventional mixing devices are ball mills, stirring mechanisms and/or static mixers.

7. A method in accordance with claim 1, wherein the electrically conductive particles are formed of the same material or of a similar material as an electrode material of the electrode to be contacted, with the electrode material of an anode differing from that of a cathode.

8. A method in accordance with claim 1, wherein the contacting mixture is applied uniformly onto the electrodes as a slip or paste by means of a rolling process, a spraying process, a casting process or a printing process.

9. A method in accordance with claim 8, wherein the printing process is a screen printing process.

10. A method in accordance with claim 1, wherein the foils are inserted during assembly between the interconnectors and the electrochemically active discs, with the foils being produced by means of foil casting or calendering.

11. A method in accordance with claim 1, wherein the layer formed from the contact mixture has a thickness in the range between 30 and 300 μm.

12. A method in accordance with claim 11, wherein the contact mixture has a thickness in the range between 50 and 200 μm.

13. A fuel cell battery having high temperature fuel cells including electrochemically active discs and interconnectors which have air-side and gas-side surface profiles with contact surfaces on raised portions, and discrete homogeneously structured connections formed between the contact surfaces and electrodes of the electrochemically active discs, wherein the fuel cell battery has contacts which are manufactured in accordance with the method in accordance with claim 1, wherein the contacts are manufactured by applying a layer consisting of a contact mixture onto the electrodes, and wherein all cell voltages in the fuel cell battery are substantially identical during operation.

14. A fuel cell battery in accordance with claim 13, wherein the stack contains a central gas distribution passage and wherein axially aligned afterburning spaces and air distribution passages are arranged at the periphery of the stack.

15. A method in accordance with claim 14, wherein the stack is a cylindrical stack with circular cells.

16. A fuel cell battery in accordance with claim 13, wherein the contact mixture forms the discrete homogeneously structured connections, and wherein the contact mixture spans surfaces of the electrodes between the contact surfaces of the raised portions.

17. A method in accordance with claim 1, wherein the hot melting composition is solid below 40° C.

18. A method in accordance with claim 1, wherein the hot melting composition is thermally removed by burning it out while maintaining the pressing force.

19. A method in accordance with claim 1, wherein the hot melting composition is in the plastic state at said working temperature when the surface profiles or the electrodes are brought into contact with the applied layer.

20. A method for the manufacture of contacts between electrochemically active discs and interconnectors in planar high temperature fuel cells the interconnectors of which have air-side and gas-side surface profiles with contact surfaces on raised portions, with the raised portions of each surface profile having the contact surfaces approximately spanning a plane and with deviations in this arrangement lying within a predetermined tolerance, in which method a layer is applied onto the electrodes of the electrochemically active discs, with the layer consisting of a contact mixture which contains electrically conductive particles and a medium embedding the particles, the surface profiles or the electrodes are brought into contact with the applied layer at a working temperature so that the raised portions penetrate into this layer and thus connections are formed between the contact surfaces and the electrically conductive particles and thus discrete homogeneously structured connections are formed between the contact surfaces and the electrodes, and finally the medium embedding the particles is removed under thermal part treatments and the discrete connections are solidified, wherein the medium embedding the particles is a hot melting composition which is solid at room temperature and wherein, at the said working temperature, the hot melting composition is in a liquid or plastic state, wherein the medium embedding the particles is applied to the electrode at or above the working temperature and then brought to a solidifying temperature to solidify the hot melting composition, or is applied as a solidified foil between the electrodes and the raised portions, and wherein the applied layer or foil is subsequently heated to said working temperature to form the discrete homogeneously structured connections, wherein the hot melting composition is in the plastic state at said working temperature when the surface profiles or the electrodes are brought into contact with the applied layer.

21. A method in accordance with claim 20, wherein visco-elastic or visco-plastic organic materials, which are solid at room temperature and which transfer on heating into a viscous or thin fluid melt, are used as the hot melting composition.

22. A method in accordance with claim 21, wherein the visco-elastic or visco-plastic organic materials are based on resins, natural and synthetic waxes, thermoplastic materials, or higher chain carboxylic acids and alcohols.

23. A method in accordance with claim 21, wherein the melting point of the hot melting composition is in a range between 40 and 80° C.

24. A method in accordance with claim 20, wherein the electrically conductive particles are mixed with the hot melting composition in heated apparatus to form a homogeneous paste, with conventional mixing devices being used.

25. A method in accordance with claim 24, wherein the conventional mixing devices are ball mills, stirring mechanisms and/or static mixers.

26. A method in accordance with claim 20, wherein the electrically conductive particles are formed of the same material or of a similar material as an electrode material of the electrode to be contacted, with the electrode material of an anode differing from that of a cathode.

27. A method in accordance with claim 20, wherein the contacting mixture is applied uniformly onto the electrodes as a slip or paste by means of a rolling process, a spraying process, a casting process, or a printing process.

28. A method in accordance with claim 27, wherein the printing process is a screen printing process.

29. A method in accordance with claim 20, wherein the foils are inserted during assembly between the interconnectors and the electrochemically active discs, with the foils being produced by means of foil casting or calendering.

30. A method in accordance with claim 20, wherein the interconnectors and the electrochemically active discs are assembled into a stack in an alternating arrangement and along a stacking axis, with this stack being uniformly heated in an assembly apparatus to the working temperature; wherein from a follow-up clamping of the assembly apparatus, which uniformly exerts a constant or variable pressing force in the direction of a stack axis, the discrete connections are produced with a reduction of the stack height by 3 to 10%, and wherein finally the hot melting composition is thermally removed.

31. A method in accordance with claim 30, wherein the hot melting composition is thermally removed by burning it out while maintaining the pressing force.

32. A method in accordance with claim 20, wherein the layer formed from the contact mixture has a thickness in the range between 30 and 300 μm.

33. A method in accordance with claim 32, wherein the contact mixture has a thickness in the range between 50 and 200 μm.

34. A fuel cell battery having high temperature fuel cells including electrochemically active discs and interconnectors which have air-side and gas-side surface profiles with contact surfaces on raised portions, and discrete homogeneously structured connections formed between the contact surfaces and electrodes of the electrochemically active discs, wherein the fuel cell battery has contacts which are manufactured in accordance with the method in accordance with claim 21, wherein the contacts are manufactured by applying a layer consisting of a contact mixture onto the electrodes, and wherein all cell voltages in the fuel cell battery are substantially identical during operation.

35. A fuel cell battery in accordance with claim 34, wherein the contact mixture forms the discrete homogeneously structured connections, and wherein the contact mixture spans surfaces of the electrodes between the contact surfaces of the raised portions.

36. A fuel cell battery in accordance with claim 35, wherein the cells form a stack which contains a central gas distribution passage and wherein axially aligned afterburning spaces and air distribution passages are arranged at the periphery of the stack.

37. A method in accordance with claim 36, wherein the stack is a cylindrical stack with circular cells.

38. A method in accordance with claim 20, wherein the hot melting composition is solid below 40° C.

* * * * *